United States Patent [19]

Sakane et al.

[11] Patent Number: 4,638,367

[45] Date of Patent: Jan. 20, 1987

[54] LIGHT METERING AND PROCESSING SYSTEM PARTICULARLY FOR A VIDEO CAMERA

[75] Inventors: Toshio Sakane; Tokuichi Tsunekawa, both of Kanagawa, Japan

[73] Assignee: Canon Kabushiki Kaisha, Tokyo, Japan

[21] Appl. No.: 698,749

[22] Filed: Feb. 6, 1985

Related U.S. Application Data

[63] Continuation of Ser. No. 238,685, Feb. 27, 1981, abandoned.

[30] Foreign Application Priority Data

Feb. 27, 1980 [JP] Japan .................................. 55-23696

[51] Int. Cl.⁴ ............................................. G03B 7/00
[52] U.S. Cl. .................................... 358/228; 358/174
[58] Field of Search ................. 358/228, 171, 22, 161, 358/169

[56] References Cited

U.S. PATENT DOCUMENTS 4,318,132 3/1982 Machida .............................. 358/228
4,339,185 7/1982 Nakauchi et al. ...................... 354/59

*Primary Examiner*—Bruce Y. Arnold
*Attorney, Agent, or Firm*—Toren, McGeady and Goldberg

[57] ABSTRACT

A light metering system for obtaining a light value by scanning the brightness distribution of the object space within a predetermined field of view. Of the thus-produced brightness signals, those which correspond to a particular target area in the view-field are given respective predetermined weights. The light value is derived on the basis of these weighted signals and the remaining signals.

37 Claims, 22 Drawing Figures

9

38

40

42

8

37

39

41

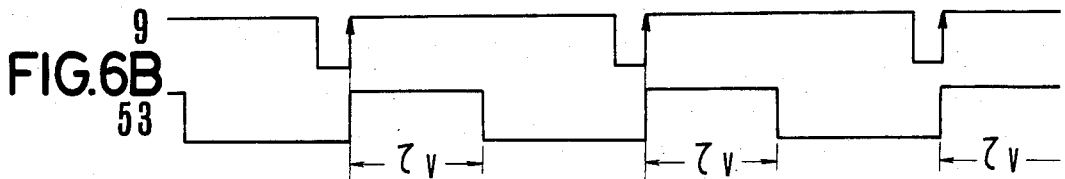
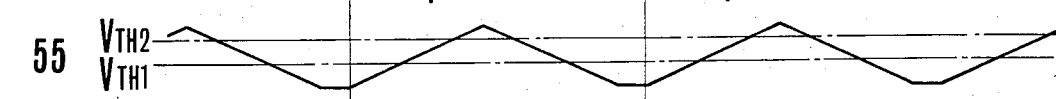
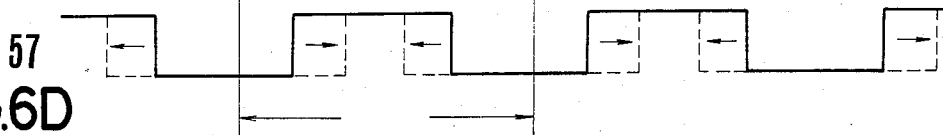
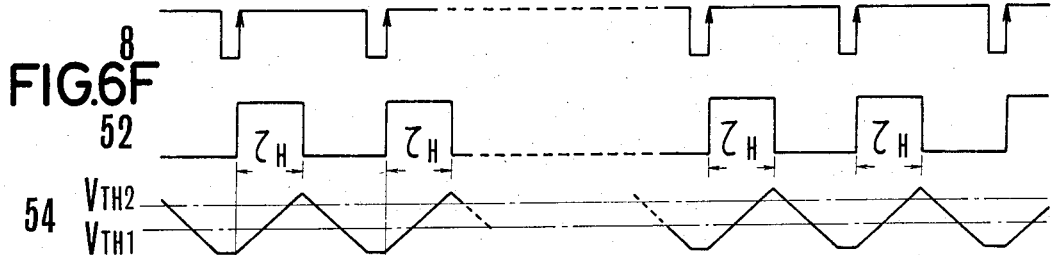
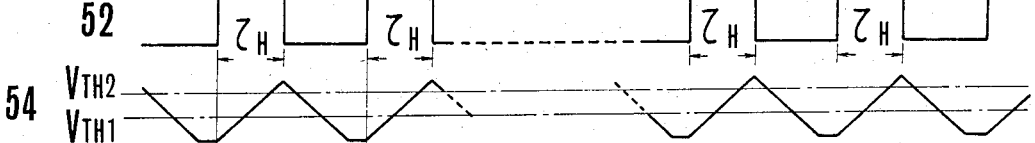
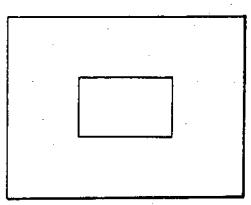
FIG.7
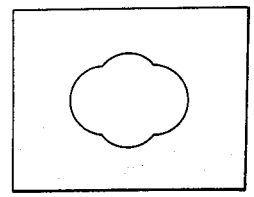
FIG.8

LIGHT METERING AND PROCESSING SYSTEM PARTICULARLY FOR A VIDEO CAMERA

This is a continuation of application Ser. No. 238,685, filed Feb. 27, 1981 now abandoned.

BACKGROUND OF THE INVENTION

1. Field of the Invention

This invention relates to light metering systems and more particularly to light metering systems suited for use in TV cameras or the like.

2. Description of the Prior Art

Cameras, such as TV cameras, utilize light metering signals representing either the average or the peak value of the brightness component of the video signal from an image pickup tube. The light metering signal is maintained at a constant level by adjusting the aperture in front of the image pickup tube or the degree of amplification of the video signal. Such conventional light metering systems create the possibility of incorrect exposures when the space of the object being photographed has a particular light distribution, such as occurs when a subject is back-lighted, e.g., a person whose picture is being taken stands in front of a bright background, or when an illuminating light source creeps in the margin of the picture frame. Under these circumstances, the exposure is determined by the bright region of the field so that the subject of principal photographic interest is often under-exposed.

SUMMARY OF THE INVENTION

With the foregoing in mind, it is an object of the present invention to provide a novel and more advantageous light metering system which has overcome the above-mentioned drawbacks of the conventional ones. One of the features of the present invention is that, while a predetermined field of view is scanned to obtain the brightness distribution of the object space, those of the concurrently produced brightness signals which correspond to a particular target area in the above-described view-field are given predetermined weights, and the thus-weighted signals and the remaining signals contribute to derive a light value.

BRIEF DESCRIPTION OF THE DRAWINGS

FIGS. 6A to 6H illustrate waveforms of the outputs of the main portions of the circuit of FIG. 5.

FIGS. 7 and 8 are plan views showing the characteristics of the circuit of FIG. 5.

DESCRIPTION OF THE PREFERRED EMBODIMENTS

Figure 1:
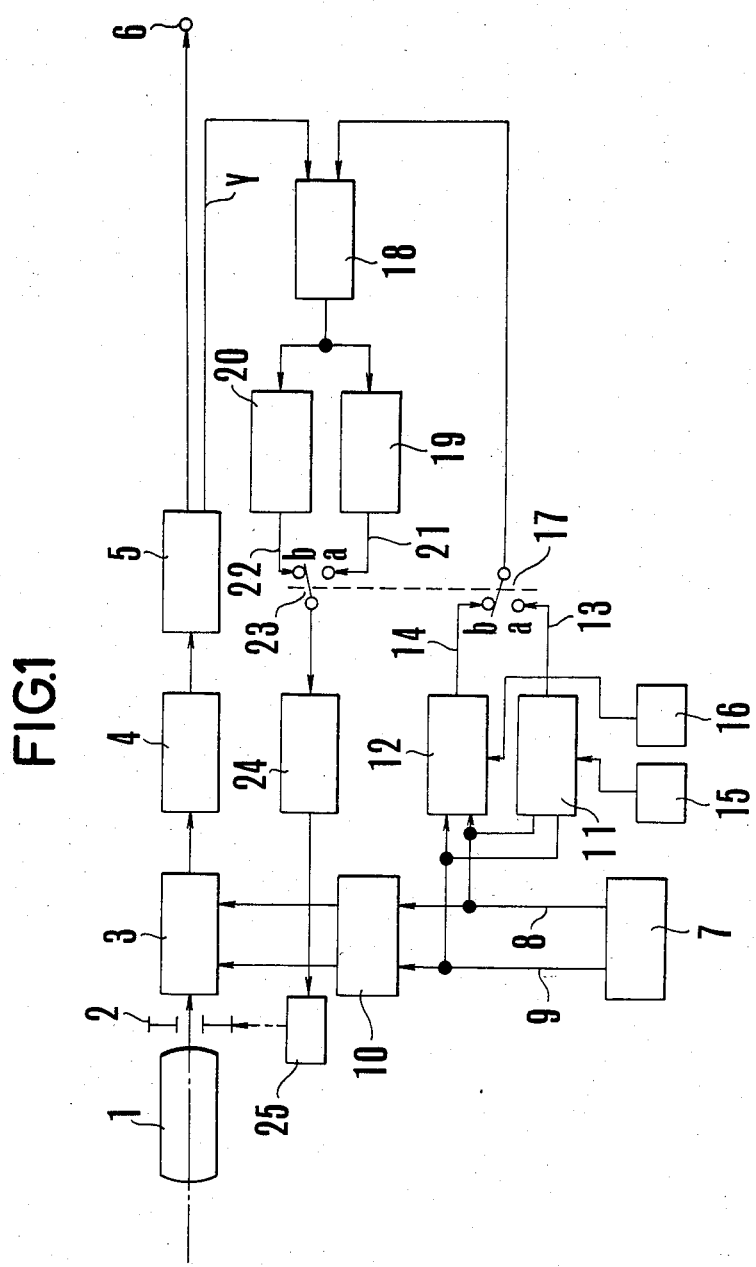
FIG. 1 is a block diagram of one embodiment of a light metering system according to the present invention applied to an automatic exposed control apparatus in the TV camera.

FIG. 1 illustrates an automatic exposure control apparatus in a TV camera employing one form of the present invention. Here, light from an object (not shown) passes through a lens 1 and a diaphragm 2 to the photoelectric surface of an image pickup tube 3 where it is converted into a charge. The scanning signals (photosignals) from the image pickup tube 3 after having been processed by a preamplifier circuit 4 and a process amplifier circuit 5, are taken out as standard television signals, that is, video signals at an outlet 6. A synchronizing signal forming circuit 5–7 generates horizontal synchronizing signals 8 and vertical synchronizing signals 9 which time a deflection circuit for controlling the deflection scanning of an electron scanning beam. Weight function generating circuits 11 and 12 are constructed so that different weight functions from each are generated on the basis of the horizontal and vertical synchronizing signals 8 and 9 from the synchronizing signal generating circuit 7, and are made to approximate a function of a picture location. Manually operable adjusting means 15 and 16 shift the weight functions to be generated by the weight function generating circuits 11 and 12 on the time axis. A selector switch 17 serves for selecting either one of the weight function signals 13 and 14 produced by the weight function generating circuits 11 and 12. A weighting computer circuit 18 weights the brightness signal Y from the process amplifier circuit 5 in accordance with the weight function signals 13 and 14 from the weight function generating circuits 11 and 12 selected by said selector switch 17. Two light metering signal output circuits 19 and 20 serve for producing light metering signals 21 and 22 by, for example, smoothing (that is, averaging) the output of said weighting computer circuit 18. Member 23 is a selector switch for selecting one of the light metering signals 21 and 22 from these light metering signal output circuits 19 and 20.

Here, since the weight function generating circuit 11 and the light metering signal output circuit 19 are paired up, and the weight function generating circuit 12 and the light metering signal output circuit 20 are paired up, the selector switch 23 is made to cooperate with the selector switch 17 in such a manner that when the weight function signal 13 from the weight function generating circuit 11 is selected by the selector switch 17, the light metering signal 21 from the light metering signal output circuit 19 is selected by the selector switch 23. When the weight function signal 14 from the weight function generating circuit 12 is selected, the light metering signal 22 from the light metering signal output circuit 20 is selected. A known diaphragm control circuit 24 produces a diaphragm control signal on the basis of the selected one of the light metering signals 21 and 22 from the light metering signal output circuits 19 and 20; and a diaphragm adjusting arrangement adjusts the diaphragm 2 on the basis of the diaphragm control signal from said diaphragm control circuit 24.

In the above construction, the abovedescribed weighting computer circuit 18 may take the form of, for example, variable gain amplifier circuit. If so, each of the above-described weight function generating circuits 11 and 12 must be constructed with, for example, a gain control circuit for producing a predetermined gain control signal output which causes the gain of said variable gain amplifier circuit to be changed in synchronism with the horizontal and vertical synchronizing signals 8 and 9 from the synchronizing signal generating circuit 7 in a predetermined, timed relationship when scanning one picture frame with the image pickup tube 3. Further, in this case, the above-described adjusting means 15 and 16 must be constructed with means capable of properly changing the synchronizing relation of said gain control circuit to the horizontal and vertical synchronizing signals 3 and 9 from the synchronizing signal generating circuit 7. Also, the light metering signal output circuits 19 and 20 may take the form of, for example, a smoothing circuit. If so, each of their smoothing constants is determined so that the light metering signals are the same level for the same brightness distribution.

Figure 2:
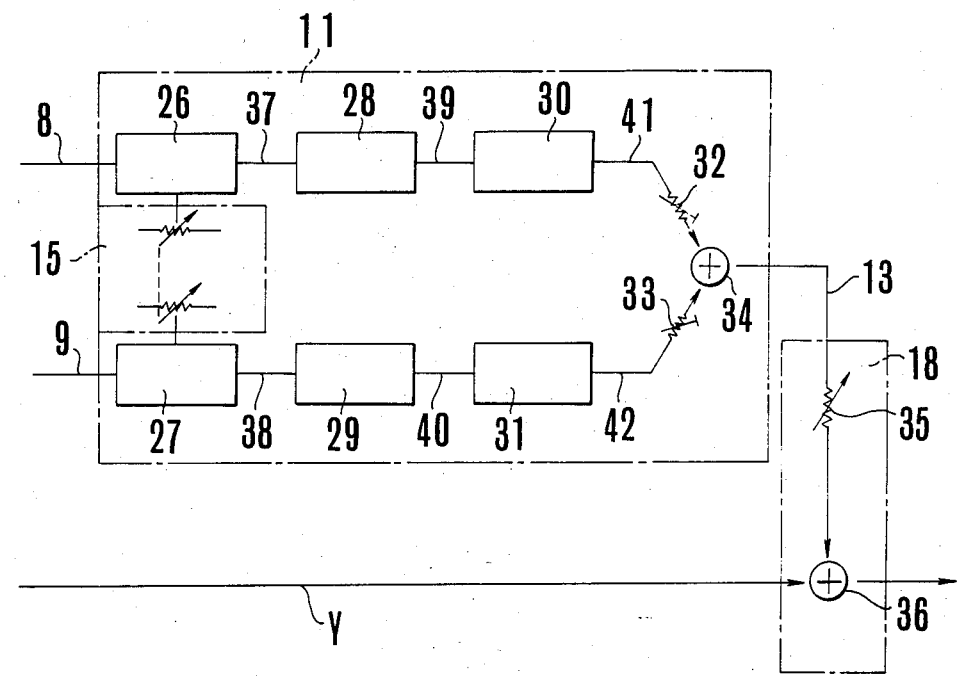
FIG. 2 is a block diagram showing the details of the function generating circuit of FIG. 1.
Figure 3A:
FIGS. 3A to 3H illustrate waveforms of the outputs of the main portions of the circuit of FIG. 2.
Figure 3B:
Figure 3C:
Figure 3D:
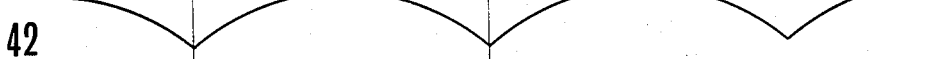
Figure 3E:
Figure 3F:
Figure 3G:
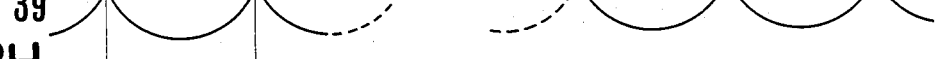
Figure 3H:

Examples of the weight function generating circuit 11, adjusting means 15 and the weighting computer circuit 18 are shown in FIG. 2. It is noted that said weight function generating circuits 11 and 12 are only different from each other in the magnitude adjusted by the adjusting means 15 and 16 respectively. Therefore, only the generating circuit 11 and adjusting means 15 are explained. In FIG. 2, responsive to the horizontal synchronizing signal 8 (see FIG. 3E) and the vertical synchronizing signal 9 (see FIG. 3A) produced from the synchronizing signal generating circuit 7, saw tooth like wave generating circuit 26 and 27 produce saw tooth like wave signals 37 (see FIG. 3F) and 38 (FIG. 3B) respectively, which are applied to integrator circuits 28 and 29. Upon integration of the respective input signals, the integrator circuit 28 produces a signal of parabolic form 39 as shown in FIG. 3G, and the integrator circuit 29 produces a signal of parabolic form 40 as shown in FIG. 3C. Each of said parabolic form signals 39,40 is inverted by respective inverter circuits 30 and 31 (see FIG. 3D and FIG. 3H). Depending upon the polarity of the signals of the saw tooth wave generating circuits 26, 27 and/or the integrator circuits 28, 29, the inverter circuits 30, 31 can be omitted. The inverted parabolic signals 41 and 42 produced from the above-described inverter circuits 30 and 31 are applied to respective level adjusting means 32 and 33 for establishing a predetermined signal level. From there the horizontal parabolic signal 41 is synchronized with the horizontal synchronizing signal 8 and the vertical parabolic signal 42 synchronized with the vertical synchronizing signal 9. Both are combined by an adder 34 in the form of, for example, an operational amplifier. Thus, from the adder 34 there is obtained one weight function signal. Elements 35 and 36 form the above-described computer circuit, the element 35 being a gain adjusting resistor, with the element 36 being an adder in the form of an operational amplifier.

FIGS. 3A to 3H show waveforms in the above-described weight function generating circuits. In this drawing, 8 and 9 represent horizontal and vertical synchronizing signals with the low level representing the respective blanking period. Curves 37 and 38 represent the output waveforms of the above-described saw tooth wave forming circuits 26 and 27 for the horizontal and vertical respectively. Curves 39 and 40 represent the output wave forms of the above-described integrator circuits 28 and 29, and 41 and 42 represent the inverted parabolic signal wave forms of the above-described inverter circuits 30 and 31.

Figure 4:
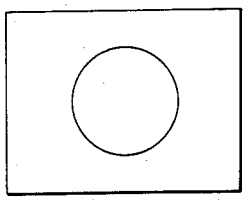
FIG. 4 is a plan view of the field or light metering with a weighted area characteristic of the circuit of FIG. 2.

FIG. 4 shows a two-dimensional display of the function in the form of an output of weight function generating circuit 11 or 12, or a CRT display. As shown here, the combined function is a circle, and the voltage level of the signal increases as it nears the center of the area of the picture fraame. The above-described function generating process enables not only the voltage level and voltage slope to be controlled arbitrarily but also the shape to be changed to a longitudinally elongated ellipse or a laterally elongated ellipse. Further, the generating process enable the position of the maximum voltage level to be displaced from the center of the area of the picture frame by controlling the shape of the saw tooth wave produced by the wave generating circuits 26, 27.

The adjusting means 15 or 16 in FIG. 2 function as time constant adjusting means for the saw tooth wave generating process in the saw tooth wave generating circuits 26 and 27.

The synthesized parabolic signal 13 is subjected to computation (multiplying) with the above-described video signal (Y) in the above-described computer circuit 18 having the above-described gain varying function (see FIGS. 1 and 2).

The variable resistor or adjusting means 35 adjusts the level of the above-described synthesized parabolic signal 13 relative to the above-described video signal (Y). After the adjustment to a predetermined level, it is applied to the operatoional amplifier 36 where addition or multiplication with the above-described video signal (Y) of positive polarity is carried out.

Here, where the operational amplifier 36 is in the form of an adder circuit, as long as the both signals do not become zero, its output does not assume a zero level. Where it is formed as a multiplier circuit, when either one of the both signals 13 and (Y) is a zero level, its output assumes a zero level. In this embodiment, any of them can be used. That which is adopted is dependent upon the construction of the diaphragm control circuit.

Next turning again to FIG. 1, the output signal of the weighting computer circuit 18 is converted to a direct current or ripple current by either of the two smoothing circuits 19 and 20 of a different time constant from each other, being produced as the smoothed signal that is light metering signal, 21 or 22, which is the applied to the above-described diaphragm control circuit 24. Hence, the size of aperture opening of the above-described diaphragm 2 is controlled through the above-described diaphragm adjusting mechanism 25 in accordance with the amplitude of this input level.

What is of importance here is that the output of the process amplifier circuit 5 or the video signal (Y) works so as to be emphasized by the weighting computer circuit 18 as the voltage level increases with a decrease in the distance from the center of the area of the picture frame in relation to the waveform of the function signal 13 or 14 from the function generator 11 or 12.

Thus, when shooting, for example, the same object, the level of the smoothed signal or light metering signal becomes higher when performing the weighted compu- tation as in the present invention than in the case of lacing the weighting computation. By that difference, therefore, the apparent object brightness as sensed is increased with the result that the diaphragm is actuated in a direction to close the aperture opening.

In other words, the size of diaphragm aperture is controlled in accordance with the brightness of the subject in the central target area. Of course, the location of the target area can be changed as has been mentioned above. Therefore, the diaphragm aperture control can be also otherwise performed by taking into account the brightness of a desired area in the field of view. It is further noted that it is also possible to perform a spot-weighted average light metering.

Figure 5:
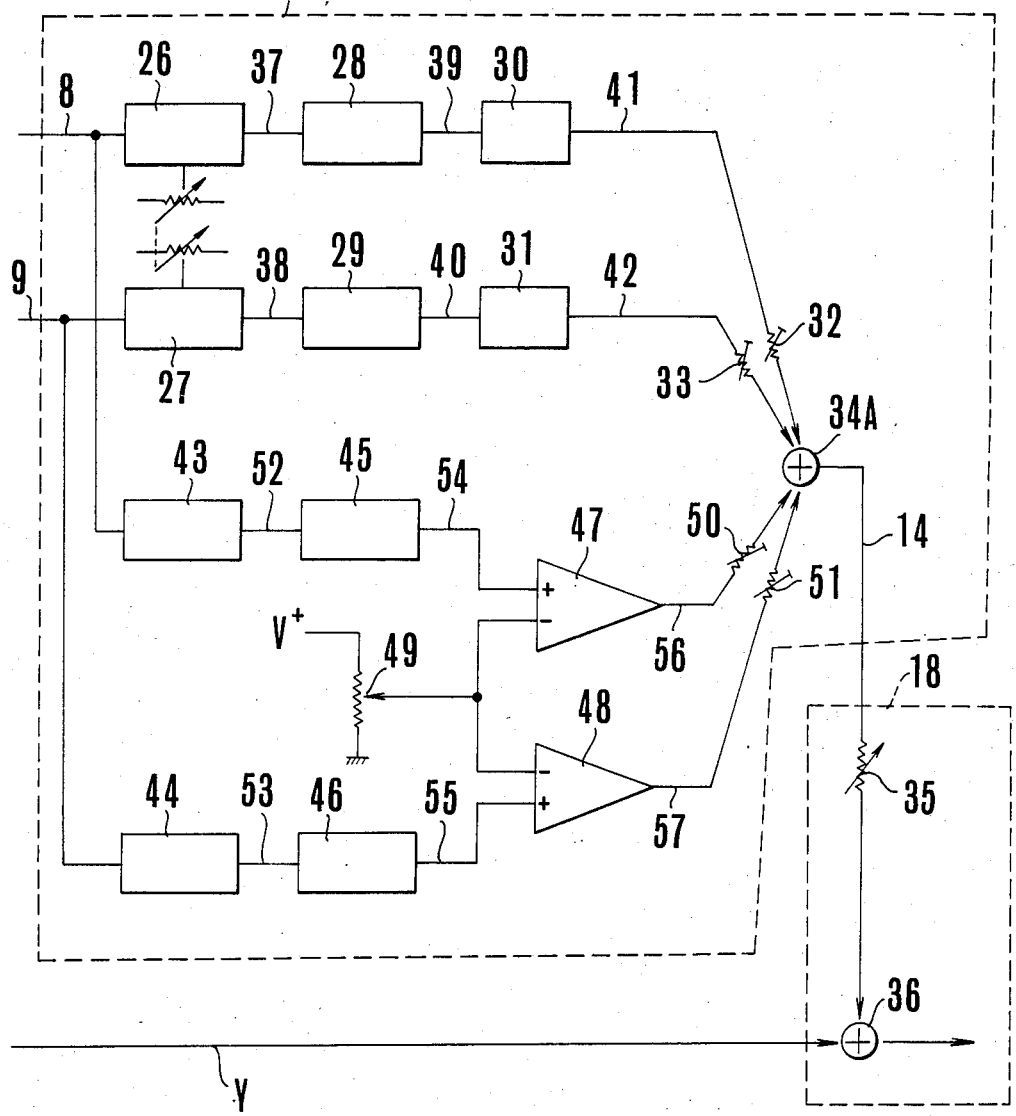
FIG. 5 is a block diagram of another embodiment of the present invention.

FIG. 35 shows another embodiment of the invention where a weight function generating circuit 12A corresponding to the generating circuit 12 of FIG. 1 and a similar computer circuit to the computer circuit 18 of FIG. 18 are only shown, and the other similar parts to those shown in FIG. 1 are omitted. Since the process for forming parabolic function signals from the horizontal and vertical synchronizing signals 8 and 9 in FIG. 5 is similar to that described in connection with the above-described FIG. 2 embodiment, its explanation is omitted here except for the notation of the same reference characters as in FIG. 2. An explanation is then given to added circuit portions. In FIG. 5, elements 43, 44 are mono-stable multi-vibrators (hereinafter called "mono-multi") responsive to the horizontal and vertical synrhronizing signals 8, 9 respectively for producing rectangular wave signals in a period equal to ½ times the effective time of them. The outputs of these mono-multis 43 and 44 after having been integrated by respective integrator circuits 45 and 46 are applied to comparators 47 and 48 respectively. Since the opposite inputs of these comparators 47 and 48 are connected to the output of a slide level adjusting means 49, the above-described integration signals are converted to pulses with a predetermined period related to the slide level.

The manner in which the duty ratio of each of the compared output pulses changes depending upon the set level of the above-described slider level adjusting means 49 is shown in FIGS. 6A to 6H.

In these waveforms, lines 52 and 53 represent the waveforms of the outputs of the above-described mono-multis 43 and 44 corresponding to the horizontal and vertical synchronizing signals 8 and 9.

The waveforms 54 and 55 likewise represent the outputs of the above-described integration circuits 45 and 46, and the waveforms 56 and 57 represent the output pulses of the above-described comparators 47 and 48 respectively. It is evident from these waveforms that the duty ratio of the pulse waveform is made to change by the above-described level adjusting means 49. Each of the pulses 56 and 57 as the duty ratio-variable horizontal and vertical components after having been level-adjusted by the adjusting means 50 and 51, have a predetermined level combined with each other to generate a weight function signal 14 corresponding to the target area shown in FIG. 7. Member 34A is an adder comprising a plurality of operation amplifiers for example.

In connection with the configuration of the weighting target area to a central rectangle it should be explained that the area of this rectangle can be controlled arbitrarily by the set level of the above-described slider level adjusting means 49, and the form of the rectangle is determined by the adjusted level of the above-described level adjusting means 50 and 51. Further, this target area can be shifted from the center of the picture frame to some extent in the horizontal (lateral) direction or in the vertical (longitudinal) direction by the time-setting of the above-described mono-stable multivibrators.

In the embodiment shown in FIG. 5, the above-described parabolic form function signals 41 and 42 and the duty ratio-variable rectangular form function signals 56 and 57 when, all are combined, represent a two-dimensional function as shown in FIG. 8 where the voltage level is further increased as it is nearer to the center of the area of the picture frame. It is noted that the operation of the other parts (not shown) is similar to that described in connection with the FIG. 1 embodiment, and therefore its explanation is omitted.

As has been described in greater detail, according to the light metering system of the present invention, a spotweighted average light metering in a sense is performed so that even when a person standing on a brighter background is to be shot, or there is a very bright area such as an illumination light source in the margin of the picture frame, a sufficiently correct exposure for the subject of principal photographic interest can be derived without an unduly large influence of such a bright area. Such a system is very advantageously applied to photographic cameras.

Although the present invention has been described in connection with an example of application particularly to the automatic exposure control apparatus in the TV camera, it is to be understood that the present invention is, of course, not confined thereto but is applicable to photographic camera, cine cameras and other various optical instruments without sacrificing the above-described prominent advantages. By the way, particularly when the system of the invention is employed in a small size instrument such as photographic camera or cine camera, it is desirable in view of its small size and compactness to use a solid state image sensor known as CCD as the means for scanning the brightness distribution of the object space.

What is claimed is:

1. An optical measuring device comprising:
   (a) image pick-up means for converting an optical image into electrical image information;
   (b) reading means for time-serially reading out the electrical image information converted in the image pick-up means;
   (c) operating means for applying a predetermined function signal to the electrical image information read out of the image pick-up means by the reading means thereby forming ouputs;
   (d) adjusting means for changing the time correlation between the function signal and the time-serial electrical image information read out of the image pick-up means; and
   (e) averaging means for averaging the outputs of the operating means.

2. An optical measuring device according to claim 1, wherein the image pick-up means is an image pick-up tube.

3. An optical measuring device according to claim 1, wherein the image pick-up means is a solid state image pick-up device.

4. An optical measuring device according to claim 1, wherein the operating means includes multiplication means for multiplying the electrical image informaltion read out of the image pick-up means by a predetermined function signal.

5. An optical measuring device according to claim 1, wherein the operating means includes adding means for adding a predetermined function signal to the electrical image information read out of the image pick-up means.

6. An optical measuring device according to claim 1, wherein the function signal and the read-out of the electrical image information are periodic, and wherein the reading means is arranged to read out the electrical image information converted by the image pick-up means at a predetermined period so that the operating means applies the periodic function signal in synchronism with the periodic read out of the electrical image information.

7. An optical measuring device according to claim 6, wherein the adjusting means varies the phase relation between the output periodically read out by the reading means and the function signal.

8. An optical measuring device according to claim 1, wherein the averaging means includes (rectifying) smoothing means for (rectifying) smoothing the output of the (mixing) operating means.

9. An optical measuring device comprising:
  (a) image pick-up means for converting an optical image into electrical image information;
  (b) reading means for time serially reading out the electrical image information converted in the image pick-up means;
  (c) operating means for applying a predetermined function signal to the electrical image information read out of the image pick-up means by the reading means thereby forming outputs;
  (d) control means for continuously varying the waveform of the function signal; and
  (e) averging means for averaging the outputs of the operating means.

10. An optical measuring device according to claim 9, wherein the image pick-up means is an image pick-up tube.

11. An optical measuring device according to claim 9, wherein the image pick-up means is a solid state image pick-up device.

12. An optical measuring device according to claim 9, wherein the operating means includes multiplication means for multiplying the electrical image information read out of the image pick-up means by a predetermined function signal.

13. An optical measuring device according to claim 9, wherein the operating means includes adding means for adding a predetermined function signal to the electrical image information read out of the image pick-up means.

14. An optical measuring device according to claim 9, wherein the function signal and the read-out of the electrical image information are each periodic, and wherein the reading means is arranged to read out the electrical image information converted by the image pick-up means at a predetermined period so that the operating means applies the periodic function signal in synchronism with the periodic read out of the electrical image information.

15. An optical measuring device according to claim 9, wherein the averaging means includes (rectifying) smoothing means for (rectifying) smoothing the output of the (mixing) operating means.

16. An optical measuring device according to claim 9, wherein the function signal applied by the operating means is a function having a weight continuously increasing toward the center of the image plane of the image pick-up means.

17. An optical measuring device comprising:
  (a) image pick-up means for converting an optical image into electrical image information;
  (b) reading means for time-serially reading out the electrical image information converted in the image pick-up means;
  (c) continuous function generating means which generates a function having a weight continuously increasing toward the center of the image plane of the imge pick-up means;
  (d) non-continuous function generating means for generating a function to supply a predetermined non-continuous weight to a predetermined part of the domain in the image picture plane of the image pick-up means;
  (e) operating means for applying to the electrical image information read out of the image pick-up means the output of the continuous function generating means and that of the non-continuous function generating means at a predetermined ratio; and
  (f) averaging means for averaging the electrical image information to which the output of the continuous function generating means and that of the non-continuous function generating means has been applied.

18. An optical measuring device according to claim 17, wherein the image pick-up means is an image pick-up tube.

19. An optical measuring device according to claim 17, wherein the image pick-up means is a solid state image pick-up device.

20. An optical measuring device according to claim 17, wherein the operating means includes multiplication means for multiplying the electrical image information read out of the image pick-up means by a predetermined function signal.

21. An optical measuring device according to claim 17, wherein the operating means includes adding means for adding a predetermined function signal to the electrical image information read out of the image pick-up means.

22. An optical measuring device according to claim 17, wherein the functional signal and the read out of the electrical image information are each periodic, and wherein the reading means is arranged to read out the electrical image information converted by the image pick-up means in a predetermined period so the operating means applies the periodic function signal in synchronism with the periodic read out of the electrical image information.

23. An optical measuring device according to claim 17, wherein the averaging means includes (rectifying) smoothing means for (rectifying) smoothing the output of the (mixing) operating means.

24. An optical measuring device comprising:
  (a) image pick-up means for converting an optical image into electrical image information;
  (b) reading means for time-serially reading out the electrical image information converted in the image pick-up means;
  (c) means for forming a plurality of kinds of function signals;
  (d) operating means for applying one of the plurality of kinds of function signals to the electrical image information read out of the image pick-up means by the reading means thereby forming outputs; and
  (e) averaging means for averaging the outputs of the operating means, said averaging means having a plurality of averaging characteristics each corresponding to one of said kinds of function signals applied by said operating means.

25. An optical measuring device comprising:
  (a) image pick-up means for converting an optical image into electrical image information;
  (b) reading means for time-serially reading out the electrical image information converted in the image pick-up means;
  (c) means for forming a plurality of kinds of function signals;
  (d) operating means for applying one of the plurality of kinds of function signals to the electrical image information read out of the image pick-up means by the reading means thereby forming outputs; and (e) averaging means for averaging the outputs of the operating means applied by function signal; and (f) control means for controlling the averaging characteristics in said averaging means in correspondence to one of the plurality of kinds of function signals which is applied to the electrical image information in said operating means.

26. An optical measuring device comprising:
(a) image pick-up means for converting an optical image into electrical image information;
(b) reading means for time-serially reading out the electrical image information converted in the image pick-up means;
(c) means for producing a function signal;
(d) changing means for changing the function signal produced by said means for producing a function signal;
(e) operating means for applying the function signal to the electrical image information read out of the image pick-up means thereby producing an output;
(f) averaging means for averaging the output of the operating means; and
(g) control means for controlling the averaging characteristics of the averaging means in correspondence to said changing of the function signal.

27. An optical measuring device according to claim 26, in which the control means controls a time constant for averaging by the averaging means.

28. A video signal processing device, comprising:
(a) operating means for generating prescribed weights for input image signals, said means having a plurality of weighting characteristics which are different from each other;
(b) level control means for controlling the level of the video signals, said level control means including adjusting means for adjusting the image signals according to said weighting characteristics, said adjusting means having a plurality of adjusting characteristics respectively corresponding to said weighting characteristics;
(c) first selection means for selecting one out of the plurality of weighting characteristics in the operating means; and
(d) second selection means for selecting one of the plurality of adjusting characteristics in the adjusting means according to the selection made by the first selection means.

29. A device according to claim 28, further comprising a signal source for forming the above mentioned input video signals, wherein the level control means controls the signal level at said signal source.

30. A device according to claim 29, wherein said signal source includes image pick-up means.

31. A device according to claim 30, wherein said level control means includes means for controlling the amount of light incident on the image pick-up means.

32. A device according to claim 31, wherein said means for controlling the amount of light includes a diaphragm.

33. A device according to claim 28, wherein said level control means includes averaging means for smoothing the weighted video signals.

34. A device according to claim 33, wherein said averaging means has a plurality of averaging characteristics respectively corresponding to the weighting characteristics, and said adjusting means performs an adjustment for the averaging characteristics in the averaging means.

35. A device according to claim 28, wherein said second selection means makes a selection of a plurality of compensating characteristics in the adjusting means in such manner that the same level of control conditions can be obtained with respect to an object having a uniform brightness distribution at the same level in correspondence with the weighting characteristics by the operating means.

36. A device according to claim 28, further comprising means for varying the time correlation of the weighting characteristics in relation to the input video signals.

37. A video signal processing device, comprising:
(a) image pick-up means for forming image pick-up signals;
(b) diaphragm means for controlling the amount of incident light into said image pick-up means; and
(c) diaphragm control means for controlling said diaphragm means corresponding to said image pick-up signal from the image pick-up means, said diaphragm control means including:
  (i) weighting means for applying weights to prescribed portions of the image pick-up signals from the image pick-up means, said weighting means having a plurality of weighting characteristics;
  (ii) first selection means for selecting one out of said plurality of weighting characteristics;
  (iii) signal forming means for forming diaphragm control signals based on the image pick-up signals which have been weighted;
  (iv) compensation means having a plurality of compensating characteristics corresponding to the weighting characteristics to compensate for the level of the diaphragm control signals at the signal forming means; and
  (v) second selection means for selecting one out of said plurality of compensating characteristics in an association with the first selection means.

* * * * *